Sept. 5, 1939.  A. CLAUD-MANTLE  2,172,168
ASSIST CORD AND COAT-HANGER BRACKET FOR AUTOMOBILES Filed Aug. 26, 1938

INVENTOR
ARTHUR CLAUD-MANTLE.
BY
ATTORNEY

Patented Sept. 5, 1939

2,172,168

UNITED STATES PATENT OFFICE 2,172,168

ASSIST CORD AND COAT-HANGER BRACKET FOR AUTOMOBILES

Arthur Claud-Mantle, Trumbull, Conn., assignor to The Bassick Company, Bridgeport, Conn., a corporation of Connecticut Application August 26, 1938, Serial No. 226,849

1 Claim. (Cl. 105—354)

The present invention relates to an assist cord and coat hanger bracket for use in automobiles or the like, and has for an object to provide a device of this character in which the assist cord bracket portion may have swinging or angular movement, without disturbing the position of the bearing and coat hanger hook portion of the device. In devices of this character heretofore in use the coat hanger hook portion moved with the swinging of the assist cord, with the result that the coat or other article being supported was apt to become disengaged. Another object is to provide a coat hanger bracket means adapted to retain the hook of a wire coat hanger member or the like against accidental displacement due to lurching of the automobile.

With the above and other objects in view embodiments of the invention are shown in the accompanying drawing and these embodiments will be hereinafter more fully described with reference thereto, and the invention will be finally pointed out in the claim.

In the drawing.

Similar reference characters indicate corresponding parts throughout the several figures of the drawing.

Figure 1:
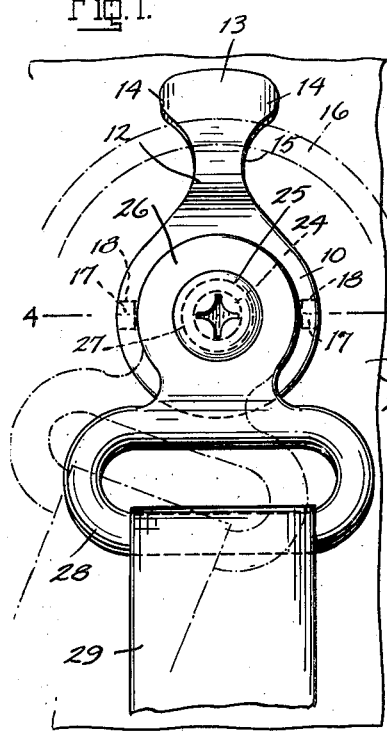
Fig. 1 is a front elevation of an assist cord and coat hanger bracket according to one exemplary illustrated embodiment of the invention, the dot-and-dash lines showing one position of angular movement of the assist cord bracket.
Figure 2:
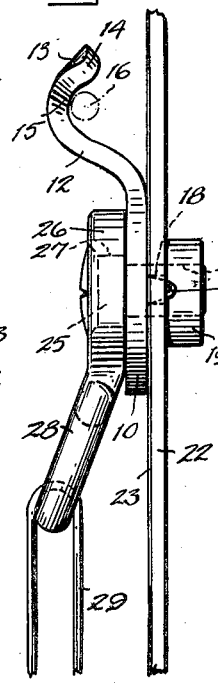
Fig. 2 is a side elevation.
Figure 3:
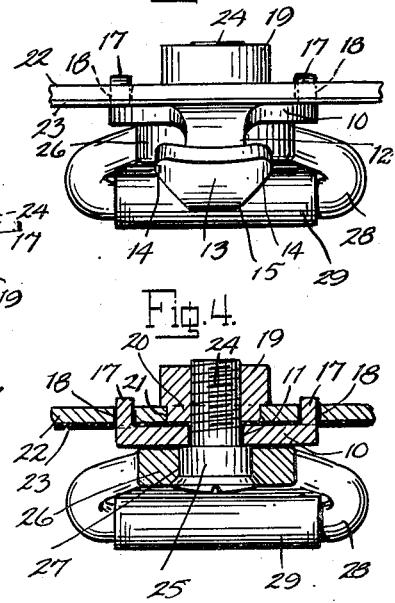
Fig. 3 is a top view.
Figure 4:
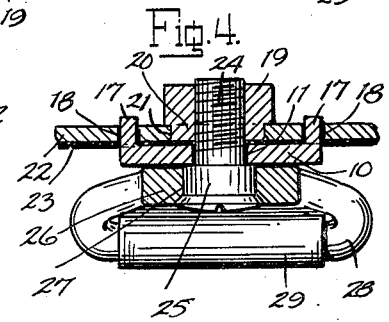
Fig. 4 is a horizontal sectional view taken along the line 4—4 of Fig. 1.

Referring to the drawing, the assist cord and coat hanger bracket according to the illustrated embodiment of the invention, shown in Figs. 1 to 4, comprises a bearing and coat hanger member 10, the lower portion of which is of circular form and provided with a central aperture 11, and the upper portion of which is extended into a coat hanger hook portion 12 which is bent forwardly and then bent rearwardly at the upper end, the upper end 13 being relatively wide and having its end extremities bent inwardly, as at 14, above the contracted neck portion 15 of the hook portion. The representation of the hook portion of a coat hanger 16 is shown in dot-and-dash lines in Figs. 1 and 2. The design of the hook is such that while it permits the hanger to be readily engaged therewith and disengaged therefrom it effectually retains it against accidental displacement due to lurching of the automobile, the inwardly bent portions 14—14 above the contracted neck 15 forming a retaining pocket in which the hook of the hanger 16 seats.

A pair of rearwardly projecting lugs 17—17 are formed upon the rearward side of the member 10 adjacent its periphery, for the purpose of interlocking engagement with holes 18—18 formed at each side of the bracket mounting clinch nut 19, having its shouldered stud portion 20 riveted in the hole 21 of the supporting wall 22 of the automobile structure. This wall is shown covered at its outer side with upholstery material 23. The member 10 is adapted to be rigidly secured to the wall 22 by means of a cap screw 24 engaged through the aperture 11 and screwed into the clinch nut 19, the shouldered bearing portion 25 of the cap screw tightly clamping the bearing member in place.

Upon the shouldered bearing portion 25 of the cap-screw there is rotatably mounted the assist cord bracket part of the device, consisting of a circular bearing portion 26 having a central countersunk aperture 27 engaged by the cap-screw, and an integrally formed loop portion 28 carrying the assist cord 29. Normally the assist cord hangs vertically, but when gripped may be swung to any position of rotation relative to the fixed member 10. During such movement the coat or other article supported upon the hook 12 remains undisturbed.

Figure 5:
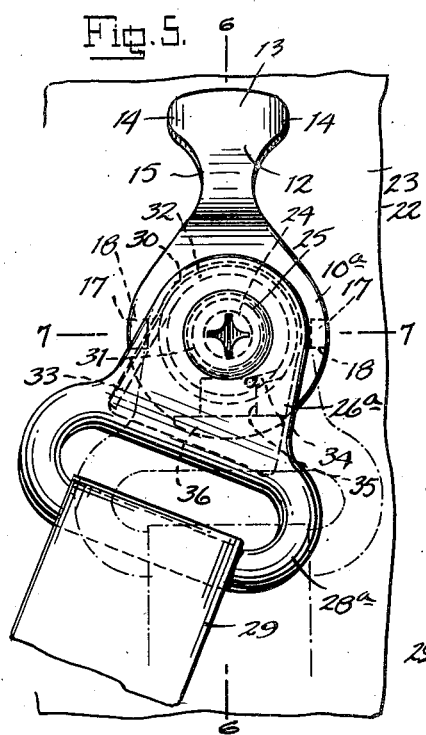
Fig. 5 is a front elevation of a modified form of the invention in which an assist cord bracket is normally retained in an angular position by spring means, the dot-and-dash lines showing the assist cord bracket swung to the vertical position of angular movement.
Figure 6:
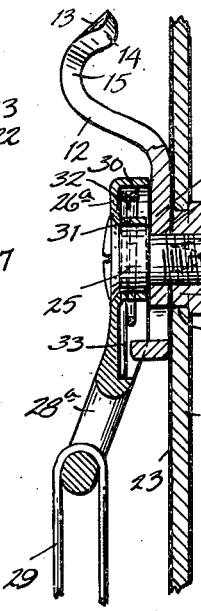
Fig. 6 is a vertical sectional view taken along the line 6—6 of Fig. 5, the assist cord bracket being in the vertical position shown in dot-and-dash lines in Fig. 5.
Figure 7:
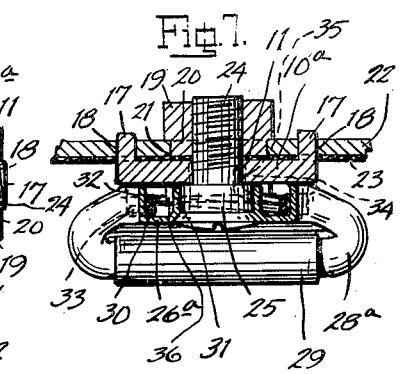
Fig. 7 is a horizontal sectional view taken along the line 7—7 of Fig. 5.

In Figs. 5 to 7 I have illustrated a modification in which the assist cord bracket member is spring actuated. The assist cord bracket consists of an upper bearing portion 26ª and a lower loop portion 28ª engaged by the assist cord 29, and substantially similar in general design to the assist cord bracket part of the first embodiment. The portion 26ª is provided at its inner side with a spring receiving pocket 30, surrounding a tubular countersunk bearing portion 31, which is engaged by the bearing portion 25 of the cap screw 24. The coil spring 32, which is disposed about the bearing sleeve 31, has one leg 33 extended downwardly and bearing against one side wall of the pocket 30 while the other end 34 is bent rearwardly and engaged in a hole 35 formed in the bearing and coat hanger member 10ª.

A forwardly projecting stop lug 36 is formed at the lower end of the member 10ª below the hole 35 and projects into the pocket 30 to limit the swinging movement of the assist cord bracket part by engagement of its ends with the two side walls of the pocket. As shown in Fig. 5 the spring normally rotates the lift cord bracket part in clockwise direction to the point where its right wall abuts the right hand end of the stop lug 36. This is the normal position, and is designed to dispose the cord in parallel relation to the side of the door frame, in the case of the door having its side edge diagonally disposed. When gripped by an occupant of the car the cord may be swung to the diagonal position opposite to that shown, being limited by engagement of the left wall of the pocket 32 with the left hand end of the stop lug 36.

I have illustrated and described preferred and satisfactory embodiments of the invention, but it will be obvious that changes may be made therein, within the spirit and scope thereof as defined in the appended claim.

Having thus described my invention what I claim and desire to secure by Letters Patent is:

In an assist cord bracket for attachment to a wall portion of an automobile structure or the like, a bearing member having an aperture and having parallel inner and outer faces, a cap screw engaged through said aperture for rigidly attaching said bearing member to said wall portion with said inner face directly engaged therewith and said outer face spaced therefrom to provide a thrust bearing surface, said cap screw including a shouldered bearing stud portion of greater diameter than said aperture bearing against said thrust bearing surface and projecting outwardly therefrom with its axis perpendicular thereto and having a shouldered head at its outer end, and an assist cord bracket member having a bearing aperture rotatably engaged with said stud and secured by said shouldered head, said bracket member being provided at its inner side with a pocket surrounding said bearing aperture in annularly spaced relation, and with spaced side wall portions provided within said pocket, outwardly projecting stop means on said bearing member engaged in said pocket between said side wall portions adapted to limit the swinging movement of said bracket member through abutment with said side wall portions, and a helical spring engaged in said pocket having one end engaged with said bearing member and the other end engaged with one of said side wall portions to normally retain the other side wall portion in engagement with said stop means.

ARTHUR CLAUD-MANTLE.